(12) United States Patent
Schatz et al.

(10) Patent No.: US 6,744,787 B1
(45) Date of Patent: Jun. 1, 2004

(54) ADAPTIVE PHASE SHIFT FILTRATION OF POINTER JUSTIFICATION JITTER IN SYNCHRONOUS-PLESIOSYNCHRONOUS SIGNAL DESYNCHRONIZATION

(75) Inventors: Ryan Richard Schatz, Coquitlam (CA); Winston Mok, Vancouver (CA); John Norman Walsh, County Galway (IE)

(73) Assignee: PMC-Sierra, Inc., Burnaby (CA)

( * ) Notice: Subject to any disclaimer, the term of this patent is extended or adjusted under 35 U.S.C. 154(b) by 707 days.

(21) Appl. No.: 09/697,119

(22) Filed: Oct. 27, 2000

(51) Int. Cl.$^7$ ................................................ H04L 7/00
(52) U.S. Cl. ...................................... 370/506; 370/516
(58) Field of Search ................................ 370/389, 391, 370/503, 504, 505, 506, 509, 516, 517, 518

(56) References Cited

U.S. PATENT DOCUMENTS

| | | | |
|---|---|---|---|
| 5,469,466 A | * 11/1995 | Chu | 370/516 |
| 5,497,405 A | 3/1996 | Elliott et al. | 370/505 |
| 5,790,538 A | * 8/1998 | Sugar | 370/516 |
| 6,526,069 B1 | * 2/2003 | Wolf et al. | 370/503 |
| 2002/0159552 A1 | * 10/2002 | Shin et al. | 375/354 |

OTHER PUBLICATIONS

Sari et al, "Cancellation of Pointer Adjustment Jitter in SDH Networks", IEEE Transactions on Communications, vol. 42, No. 12, Dec. 1994, pp. 3200–3207.

* cited by examiner

*Primary Examiner*—Salvatore Cangialosi
(74) *Attorney, Agent, or Firm*—Townsend and Townsend and Crew LLP; Kenneth R. Allen (57) ABSTRACT

Pointer justification event induced low frequency jitter is attenuated during desynchronization of a synchronous input data stream into a plesiosynchronous output data stream. The output data stream has a clock rate T and is made up of tb byte multi-frames containing a nominal number tdb of data bits (tdb=772 and tb=104 for T1 data; tdb=1024 and tb=140 for E1 data). An integer number pc of phase adjustment commands are provided (in the preferred embodiment, pc=12 for T1 data and pc=9 for E1 data). A count having a total value pjT, where $1 \leq pjT \leq tb$, is maintained of the total number of positive pointer justification events previously encountered in the data stream. A separate count having a total value pcT, where $1 \leq pcT \leq tdb*pc$, is maintained of the total number of previously issued phase adjustment commands. If a positive pointer justification event is detected in the data stream, pjT is incremented by one. If a negative pointer justification event is detected in the data stream, pjT is decremented by one. If, at any rime, tdb/tb*pjT*pc>pcT, then positive phase adjustment commands are issued and pcT is incremented by one for each issued positive phase adjustment command, until tdb/tb*pjT*pc=pcT. If, at any time, tdb/tb*pjT*pc<pcT, then negative phase adjustment commands are issued and pcT is decremented by one for each issued negative phase adjustment command until tdb/tb*pjT*pc=pcT. The rate of command issuance can be adaptively varied as a function of the magnitude of the difference between pcT and tdb/tb*pjT*pc. The clock rate T is varied by adding the issued positive phase adjustment commands to the clock rate T and subtracting the issued negative phase adjustment commands from the clock rate T as the phase adjustment commands are issued.

5 Claims, 5 Drawing Sheets

| Byte | VC-11 Contents |
|---|---|
| 1 | V5 |
| 2 | R R R R R R d R |
| 3 : 26 | 24 Bytes (192 d) |
| 27 | J2 |
| 28 | C1 C2 O O O O d R |
| 29 : 52 | 24 Bytes (192 d) |
| 53 | Z6 |
| 54 | C1 C2 O O O O d R |
| 55 : 78 | 24 Bytes (192 d) |
| 79 | Z7 |
| 80 | C1 C2 R R R S1 S2 R |
| 81 : 104 | 24 Bytes (192 d) |

LEGEND
V5, J2, Z6, Z7 - VC overhead bytes
R - stuff bit
C1 - stuff control bit for S1
C2 - stuff control bit for S2
O - overhead communication channel bit
d - VC payload data bit

FIGURE 3A

| Byte | VC-12 Contents |
|---|---|
| 1 | V5 |
| 2 | R R R R R R R R |
| 3 : 34 | 32 Bytes (256 d) |
| 35 | R R R R R R R R |
| 36 | J2 |
| 37 | C1 C2 O O O O R R |
| 38 : 69 | 32 Bytes (256 d) |
| 70 | R R R R R R R R |
| 71 | Z6 |
| 72 | C1 C2 O O O O R R |
| 73 : 104 | 32 Bytes (256 d) |
| 105 | R R R R R R R R |
| 106 | Z7 |
| 107 | C1 C2 R R R R S1 |
| 108 | S2 d d d d d d d |
| 109 : 139 | 31 Bytes (248 d) |
| 140 | R R R R R R R R |

ADAPTIVE PHASE SHIFT FILTRATION OF POINTER JUSTIFICATION JITTER IN SYNCHRONOUS-PLESIOSYNCHRONOUS SIGNAL DESYNCHRONIZATION

TECHNICAL FIELD

This invention pertains to minimization of low frequency jitter during desynchronization (demapping) of virtual tributary/tributary unit (VT/TU) synchronized data signals into plesiosynchronous data signals.

BACKGROUND

The SONET/SDH synchronous optical network connection standard uses so-called "pointers" to enable movement of synchronous payload envelopes (SPE) across plesiosynchronous (PD)H) boundaries (i.e. between network elements having separate, nearly synchronized clocks) without incurring the delays and data loss associated with the use of large slip buffers for synchronization. Frequency differences between network elements are handled by moving ("justifying") the pointers to relocate the SPE within the SONET frame. Unlike slips, pointer justifications do not cause loss of data, but they do cause sudden phase changes. When the payload is demultiplexed from the SONET transport signal, these pointer justification events result in jitter. Low frequency jitter accumulation due to very low frequency pointer justification events can be problematic and difficult to efficiently remove.

One prior art technique for attenuating pointer justification induced low frequency jitter utilizes a phase lock loop (PLY) incorporating a voltage controlled oscillator (VCO) having a frequency characteristic governed by the level of the first-in first-out (FIFO) buffer (sometimes called an "elastic store") through which the data stream is processed. However, VCO-based PLL techniques involve comparatively expensive analog circuitry which is difficult to fine tune and which often requires labour intensive "tweaking" during manufacture.

Another prior art "fixed bit leaking" technique applies a fixed spreading rate to the data stream, with the fixed rate being governed by the maximum jitter frequency offset to be attenuated. However, usage of a fixed rate prevents appropriate jitter attenuation if the jitter frequency offset is close to the nominal clock rate. Disadvantages of the fixed bit leaking technique are addressed by an "adaptive bit leaking" prior art technique in which statistical indicia of pointer justification events are accumulated over time, and the speed of the leak rate is varied in an effort to match variations in the statistical indicia. Such adaptation algorithms can successfully attenuate pointer justification induced low frequency jitter, but require complex monitoring of the FIFO buffer depth, and access to the FIFO buffer pointers.

In *Cancellation of Pointer Adjustment Jitter in SDH Networks*, IEEE Transactions on Communications, Vol. 42, No. 12, December 1994, pp. 3200–3207, Sari et al disclose a closed-loop threshold modulation adaptive phase spreading technique. Although somewhat simpler than the aforementioned adaptive bit leaking and threshold modulation techniques, the closed-loop characteristic of the Sari et al method is inherently complex. U.S. Pat. No. 5,497,405 Elliott et al issued Mar. 5, 1996 discloses an "Open Loop Desynchronizer" which decodes deviations from a nominal bit stuff bit rate to generate a frequency deviation control signal. This signal is used to control a digital filter and a numerically controlled oscillator (NCO). However, the particular method used to derive the frequency deviation control signal is unclear; and, a relatively expensive, accurate digital-to-analog converter having a very high sampling frequency is required.

The present invention facilitates all-digital adaptive attenuation of pointer justification induced low frequency jitter, independently of FIFO buffer depth. Signals transmitted over a SONET/SDH link can be desynchronized (demapped) by a demapper incorporating the invention. The demapper converts the SONET/SDH signal to a plesiosynchronous signal for transmission over a plesiosynchronous link in such a manner that the demapping operation is lossless over time (i.e. the number of bits in equals the number of bits out over time), thus allowing utilization of a FIFO buffer without the need to monitor the buffer's depth by observing its pointers.

SUMMARY OF INVENTION

The invention facilitates attenuation of pointer justification event induced low frequency jitter during desynchronization of a synchronous input data stream into a plesiosynchronous output data stream. The output data stream has a clock rate. T and is made up of tb byte multi-frames containing a nominal number tdb of data bits (tdb=772 and tb=104 for T1 data; tdb=1024 and tb=140 for E1 data). An integer number pc of phase adjustment commands are provided (in the preferred embodiment, pc 12 for T1 data and pc=9 for E1 data), A count having a total value pjT, where $1 \leq pjT \leq tb$, is maintained of the total number of positive pointer justification events previously encountered in the data stream. A separate count having a total value pcT, where $1 \leq pcT \leq tdb*pc$, is maintained of the total number of previously issued phase adjustment commands. If a positive pointer justification event is detected in the data stream, pjT is incremented by one. If a negative pointer justification event is detected in the data stream, pjT is decremented by one. If, at any time, $tdb/tb*pjT*pc>pcT$, then positive phase adjustment commands are issued and pcT is incremented by one for each issued positive phase adjustment command, until $tdb/tb*pjT*pc=pcT$. If, at any time, $tdb/tb*pjT*pc<pcT$, then negative phase adjustment commands are issued and pcT is decremented by one for each issued negative phase adjustment command until $tdb/tb*pjT*pc=pcT$. The rate of command issuance can be adaptively varied as a function of the magnitude of the difference between pcT and $tdb/tb*pjT*pc$. The clock rate T is varied by adding the issued positive phase adjustment commands to the clock rate T and subtracting the issued negative phase adjustment commands from the clock rate T as the phase adjustment commands are issued.

DESCRIPTION

Figure 1:
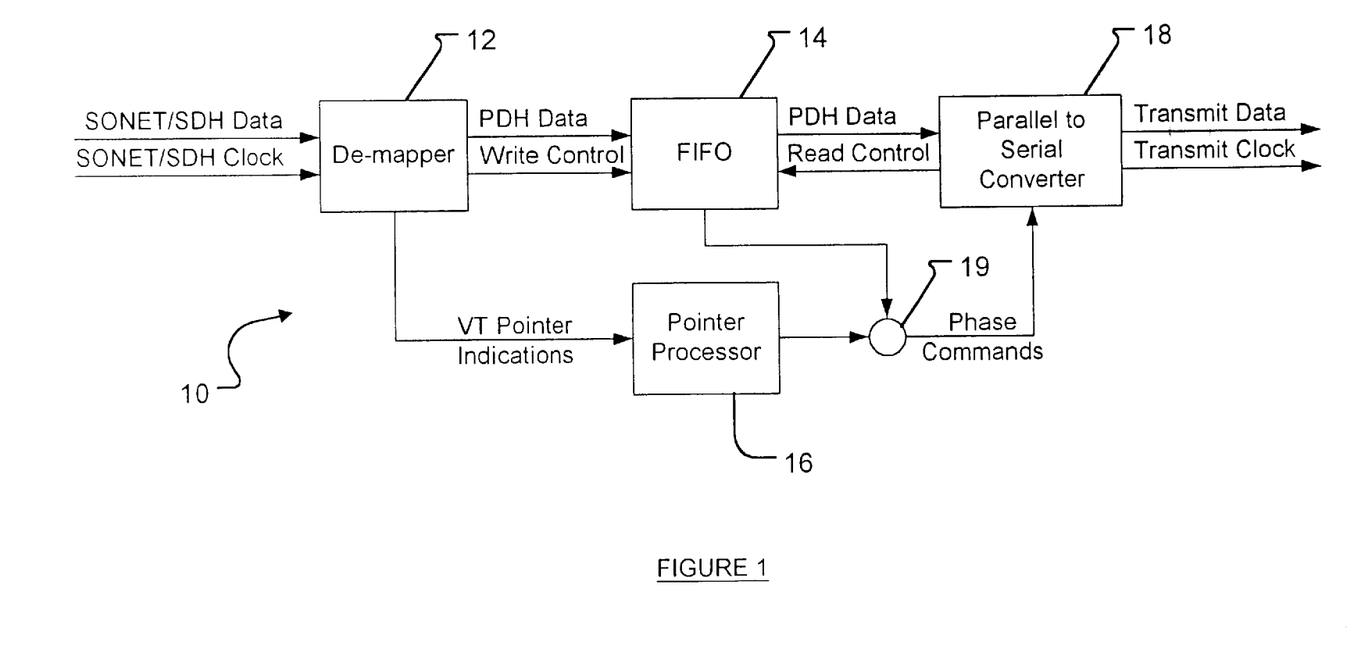
FIG. 1 is a block diagram representation of a virtual tributary/tributary unit (VT/TU) signal desynchronizer incorporating the invention.
Figure 2:
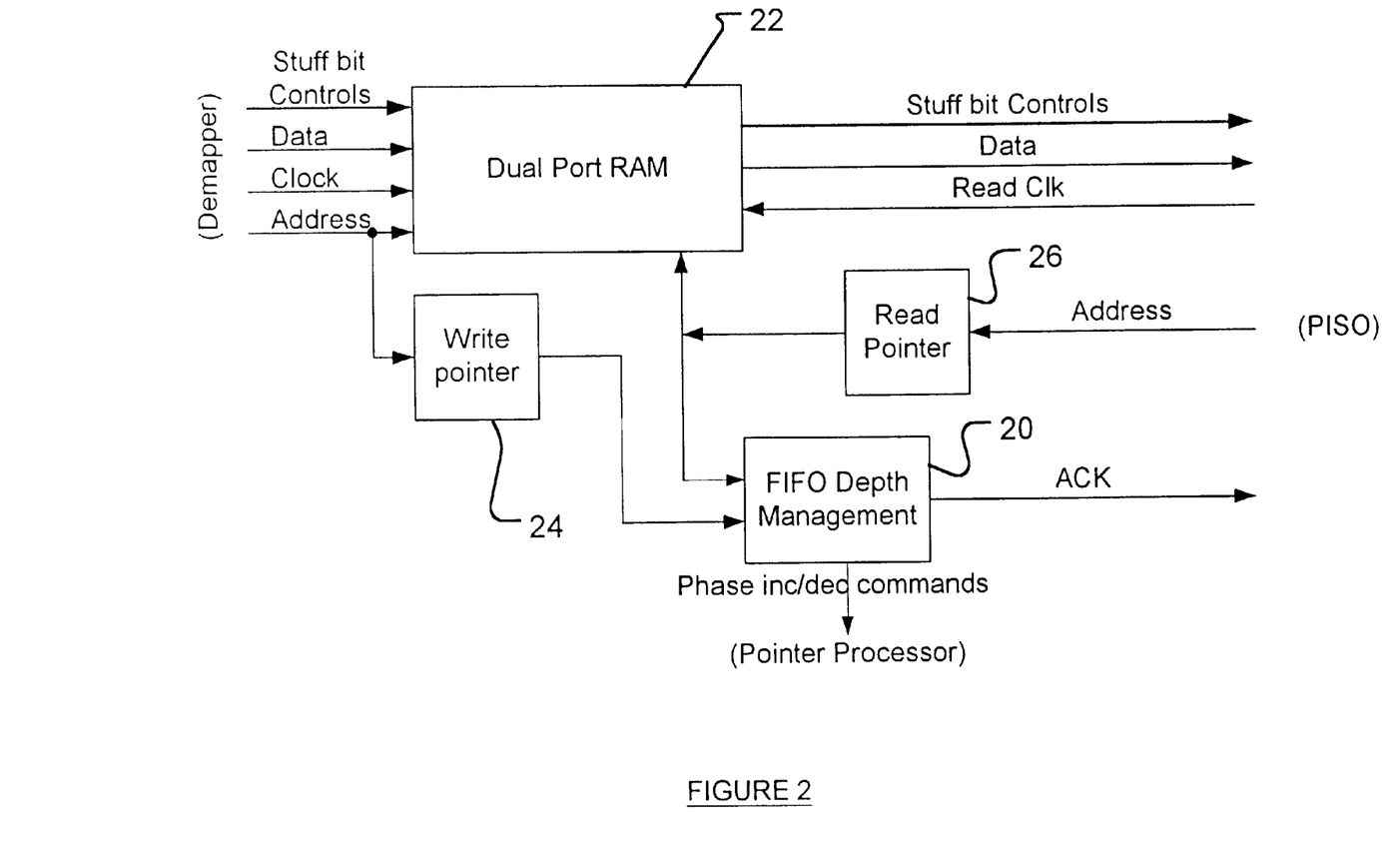
FIG. 2 is a block diagram representation of the FIFO buffer portion of the FIG. 1 signal desynchronizer.

As shown in FIG. 1, the invention provides an open-loop virtual tributary/tributary unit (VT/TU) desynchronizer 10 incorporating demapper 12, FIFO buffer 14, pointer processor 16 and parallel-in-serial-out (PISO) converter 18. Desynchronizer 10 demaps an incoming SONET/SDH (synchronous) data stream for output as a plesiosynchronous PDH data stream. The demapped data and its associated clock (bit stuff) control information is blindly forwarded to FIFO 14 at the data extraction rate, such that demapper 12 need not keep track of the FIFO's write pointer 24 (FIG. 2).

As hereinafter explained, demapper 12 extracts pointer justification events from the incoming SONET/SDH data stream and forwards the events to pointer processor 16, which filters the events by redistributing them as a series of small equally spaced partial Unit Interval (UI) segments termed "phase commands". PISO 18 generates the nominal clock rate dictated by the predefined data mapping structure and uses the aforementioned stuff control information and phase commands to adaptively increase or decrease the clock frequency, relative to its nominal value. Data is then extracted from FIFO 14 by PISO 18 at the resultant frequency rate.

A FIFO depth manager 20 (FIG. 2) initializes FIFO 14 to a fill level at which subsequent data loss does not occur during normal operation by monitoring the FIFO's fill level on initialization and, if predefined low or high threshold levels are exceeded, issuing high priority phase adjustment commands to PISO 18 via arbitrator 19. PISO 18 responds to such commands by delaying or advancing the phase of the clock rate generated by PISO 18 until FIFO 14's fill level has moved sufficiently far away from the threshold levels. Phase adjustment commands issued by depth manager 20 have higher priority than phase adjustment commands issued by pointer processor 16. Any phase adjustment commands issued by pointer processor 16 during processing of higher priority depth manager phase adjustment commands are buffered by pointer processor 16 for subsequent processing in PISO 18. The FIFO depth manager's operation is therefore completely separate from the pointer justification event smoothing operation of pointer processor 16. Data is written blindly into FIFO 14's dual port random access memory (RAM) 22, such that demapper 12 need not keep track of the FIFO's write or read pointers 24, 26. Only depth manager 20, which is separate from demapper 12, keeps track of write pointer 24.

Pointer justification events cause phase adjustments of either +1, –1 or 0, depending upon the pointer justification event value. Conventionally, each pointer justification event results in a single phase increment operation if the pointer justification event value is +1, or a single phase decrement operation if the pointer justification event value is –1, or no operation if the pointer justification event value is 0. However, instead of translating each pointer justification event into a single phase increment or decrement operation, pointer processor 16 redistributes each pointer justification event as a series of small equally spaced partial Unit Interval (UI) phase commands as hereinafter explained.

Figure 4A:
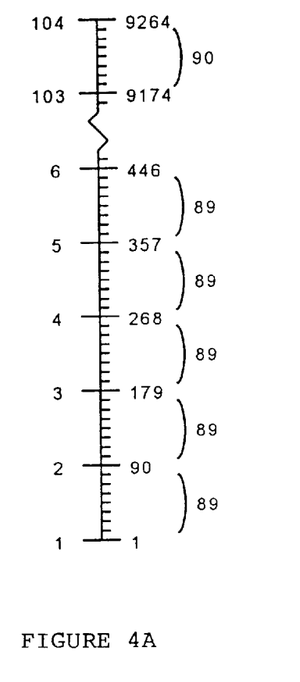
FIGS. 4A and 4B graphically depict the total number of positive pointer justification events processed in accordance with the invention (left side of each scale) and the total number of partial Unit Interval phase commands added in accordance with the invention (right side of each scale) for VC-11s and VC-12s respectively.
Figure 4B:
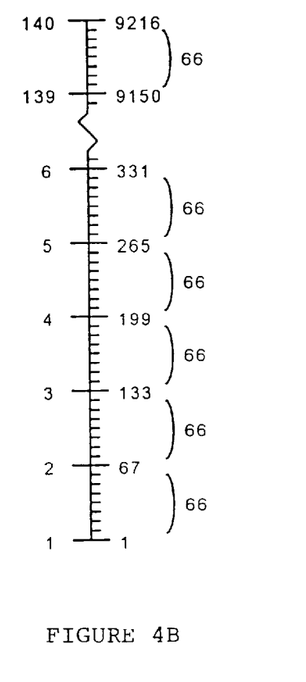

It is convenient to visualize the invention's manipulation of pointer justification events as depicted in FIGS. 4A and 4B. The left side of each scale represents the total number of positive pointer justification events which have been processed in accordance with the invention. The right side of each scale represents the total number of partial Unit Interval phase commands added in accordance with the invention.

When a positive pointer justification event (i.e, corresponding to a phase adjustment value of +1) is received, the value represented on the left side of the FIGS. 4A, 4B scales is increased by 1. When a negative pointer justification event (i.e. corresponding to a phase adjustment value of –1) is received, the value represented on the left side of the FIGS. 4A, 4B scales is decreased by 1. When a null pointer justification event (i.e. corresponding to a phase adjustment value of 0) is received, the value represented on the left side of the FIGS. 4A, 4B scales is not changed. The right side of the FIGS. 4A, 4B scales represents the amount by which PISO 18 must adjust its output clock signal to accommodate any such pointer justification events.

Figure 3A:
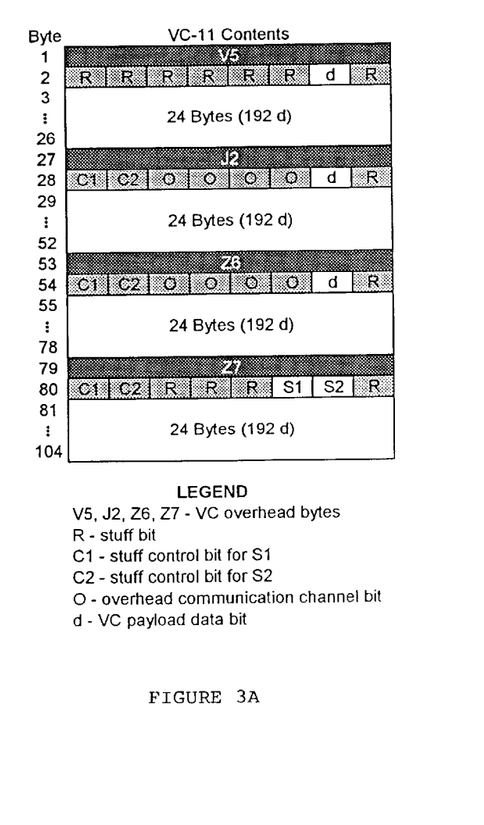
FIG. 3A depicts the contents of a VC-11 multi-frame.
Figure 3B:
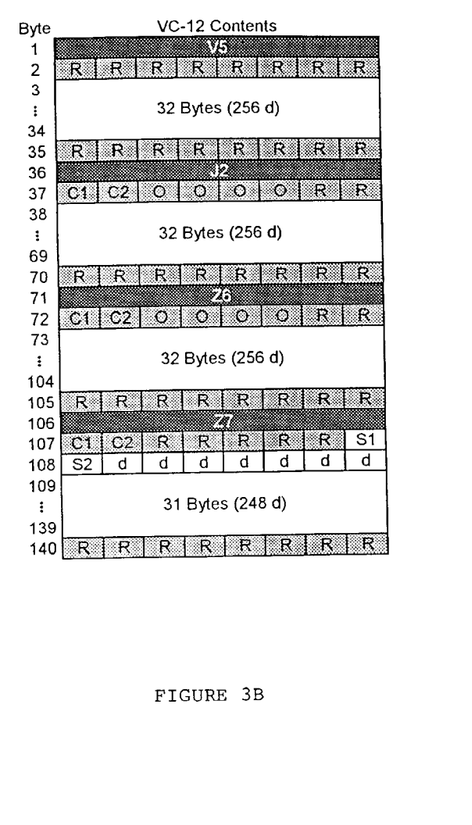
FIG. 3B depicts the contents of a VC-12 multi-frame.

In general, positive pointer justification events result in addition of cycles to the clock signal output by PISO 18, and negative pointer justification events result in removal of cycles. But, accurate operation can not be achieved by simply adding or removing an integer number of cycles in response to positive pointer justification events. This is because a pointer justification event may occur in any of the bytes in the VC, including the overhead bytes. For example, as shown in FIG. 3A, each T1 VC-11 multi-frame contains 104 bytes, any of which, excluding the V1, V2 and V4 pointer bytes, may contain a pointer justification event. The left side of the FIG. 4A scale accordingly has integer values 1 through 104 to facilitate identification of pointer justification events affecting any of the 104 T1 multi-frame bytes. Similarly, as shown in FIG. 3B, each E1 VC-12 multi-frame contains 140 bytes, any of which may contain a pointer justification event. The left side of the FIG. 4B scale accordingly has integer values 1 through 140 to facilitate identification of pointer justification events affecting any of the 140 E1 multi-frame bytes. Of the 104 T1 VC-11 multi-frame bytes, only 772 bits (nominally) are part of the mapped data stream; the rest are overhead bits. The average number of data bits per pointer justification in a T1 VC-11 multi-frame, excluding overhead is 772 divided by 104. This is a repeating decimal value, not an integer value.

It is accordingly impossible to use an integer number of clock cycles to compensate for pointer justification events in any multi-frame byte so that no data will be lost. The present invention solves this problem by separately tracking (1) all bytes in the multi-frame's repeating block structure (i.e. 104 bytes for VC-11, or 140 bytes for VC-12) and (2) the clock cycles required to compensate for pointer justification events. Each block has a fixed number of data bits, which may be either 771, 772 or 773 for VC-11. If the bit stuff events are removed and processed separately from the data, one may validly assume that the nominal number of data bits averaged over a large number of VC-11 multi-frames will remain constant at 772. By keeping track of all bytes in the multi-frame's repeating block structure, one may also keep track of an integer number of cycles added to the clock signal which PISO 18 must output for each tracked byte of pointer movement. The integers can be associated with each byte of the 104 in such a way that the total is the nominal value (i.e. 772).

For example, suppose desynchronizer 10 incorporates a local synchronous 19.44 MHz clock that is frequency offset from the clock used to map an incoming VC-11 stream such that one positive (+1) pointer justification event occurs each second. After 104 seconds a +1 pointer justification event will have occurred for each of the 104 bytes in the VC-11. The sequence then repeats (i.e. wraps from 104 back to 1) such that the next +1 pointer justification event is applied to the first byte of the 104 byte VC-11, and so on. After processing all 104 pointer justification events, one will have added 772 nominal clock cycles to the clock signal output by PISO 18, plus or minus any stuff bits which are processed separately by PISO 18. The same result is obtained when negative pointer justification events are processed, except that one counts down through the 104 positions on the left side of the FIG. 4A scale instead of up, wrapping backwards from 1 to 104, Such wrapping is easily achieved with a modulus-n byte counter.

More particularly, upon receipt of a positive pointer justification event value (+1) pointer processor 16 increments its internal positive byte counter (not shown) by 1. Upon receipt of a negative pointer justification event value (−1), pointer processor 18 decrements its internal byte counter by 1. In either case, the resultant byte level value is converted to an equivalent total data clock count value using a stored look-up table. Suppose that the current byte level value is "15". Since the average number of data clock signals per pointer movement is 772 bits/104 bytes= 7.4230769 . . . bits/byte, the total data clock count value should be 7.4230769*15≅111, although this value could be off by ±1. It is only necessary to ensure that, after 104 bytes have been processed, the total data clock count value is exactly 772. This is achieved by further converting the total data clock count value to an equivalent number of so-called partial Unit Interval positive phase adjustment commands in order to spread the jitter effect over multiple bits. The number of available phase commands corresponds to the total number of clock signal templates selected as hereinafter explained (i.e., 12 for T1, and 9 for E1 in the preferred embodiment, but any number of clock signal templates can be used). Continuing with the foregoing T1 example, 111*12=1332 positive phase commands. If no positive phase commands have yet been processed, then positive phase adjustment commands are sequentially issued until the value 1332 is reached, at which point no further phase commands are issued. The outermost values on the right side of the FIG. 4A scale represent the intervals between each positive byte count in positive phase adjustment intervals. For example, the average number of positive phase adjustment intervals per positive byte is 772/104*12=89.0769 . . . (repeating decimal value). The numbers 89 and 90 are accordingly distributed between each of the 104 intervals to yield a total of 772*12=9264 as hereinafter explained.

If the total number of executed positive phase adjustments exceeds the aforementioned equivalent number of positive phase adjustments, then negative phase adjustment commands are issued at the appropriate time intervals and the total number of executed positive phase adjustments (i.e. the value represented on the right side of the FIGS. 4A, 4B scales) is simultaneously decremented until the total number of executed positive phase adjustments equals the desired equivalent number of positive phase adjustments. If the total number of executed positive phase adjustments does not exceed the equivalent number of positive phase adjustments then positive phase adjustment commands are issued at the appropriate time intervals and the total number of executed positive phase adjustments is simultaneously incremented until the total number of executed positive phase adjustments equals the desired equivalent number of positive phase adjustments.

Upon receipt of a pointer justification event value of 0, pointer processor IS does not modify its internal positive byte counter. However, if the total number of executed positive phase adjustments does not equal the desired equivalent number of positive phase adjustments, then phase adjustment commands are issued as aforesaid until the two values are equal. If desired, the rate at which phase adjustment commands are issued can be adaptively varied as a function of the magnitude of the difference between the two values. For example, the rate can be accelerated if the difference between the two values exceeds a predetermined threshold in order to expedite equalization of the two values.

In summary, a count having a total value pjT is maintained of the total number of positive pointer justification events previously encountered in the data stream. The count wraps as aforesaid, such that $1 \leq pjT \leq tb$ where tb is the number of bytes per multi-frame. A separate count having a total value pcT is maintained of the total number of previously issued phase adjustment commands. This count also wraps, such that $1 \leq pcT \leq tdb*pc$ where tdb is the nominal number of data bits per multi-frame and pc is the available number of phase adjustment commands. If a positive pointer justification event is detected in the data stream, pjT is incremented by one. If a negative pointer justification event is detected in the data stream, pjT is decremented by one. If, at any time, tdb/tb*pjT*pc>pcT, then positive phase adjustment commands are issued and pcT is incremented by one for each issued positive phase adjustment command, until tdb/tb*pjT*pc=pcT. If, at any time, tdb/tb*pjT*pc<pcT, then negative phase adjustment commands are issued and pcT is decremented by one for each issued negative phase adjustment command until tdb/tb*pjT*pc pcT. The clock rate is varied by adding positive phase adjustment commands to the clock rate as the commands are issued and subtracting the negative phase adjustment commands from the clock rate as they are issued.

The preferred T1 embodiment of the invention uses 12 clock interval templates to generate clock signals. There are 772 nominal payload bits in a T1 multi-frame so, on average, 772*12=9264 T1 payload bits can be carried by the 104 T1 bytes represented on the left side of the FIG. 4A scale in the T1 embodiment. As hereinafter explained, 9 clock interval templates are used to generate clock signals in the preferred E1 embodiment of the invention; and, there are 1024 nominal payload bits in an E1 multi-frame so, on average, 1024*9=9216 E1 payload bits can be carried by the 140 E1 bytes represented on the left side of the FIG. 4B scale in the E1 embodiment.

Upon receipt of a pointer justification event value, pointer processor 16 creates a plurality of partial UI phase commands as aforesaid. Instead of affecting only one bit, as is the case if the pointer justification event results in a single phase increment or decrement operation, each partial UI phase command affects a different bit, thereby distributing the response to each pointer justification event over a number of bits. The number of actual partial UI phase commands between each major increment on the right hand scale (i.e. 89, 89, . . . 90 on the FIG. 4A VC-11 scale; and, 66, . . . ,66 on the FIG. 4B VC-12 scale) can be arranged as an even distribution of apcp and apcp+1 to satisfy the fractional part of the equation:

$$apcp = \frac{tdb}{tb} \times pc$$

where apcp is the average number of phase commands per tributary pointer justification.

PISO 18 multiplies a reference clock signal REFCLK (uppermost waveform in FIG. 5) produced by an internal oscillator (not shown) by a value approximately equal to pc to derive the plesiosynchronous clock signal used to re-time the output data stream. If the multiplication result does not precisely equal the nominal plesiosynchronous clock rate derived from the incoming synchronous SONET/SDH signal, then an even distribution of clock periods pc and pc+1 (multiplied by REFCLK) is generated to produce E clock waveform template containing the total nominal plesiosynchronous clock periods for the entire tributary multi-frame (772 for T1, 1024 for E1). Otherwise, the clock waveform template is uniformly composed of cycles of period pc×REFCLK. The clock waveform template is then offset by the reference clock pc times to generate pc different templates of the nominal clock signal. When a phase command is received by PISO 18, the current template is changed by +1, 0, or −1 depending upon the phase command value. When a positive or negative bit stuff command is received in a tributary multi-frame, a different template is substituted for the template which contains a number of clock periods equal to the total number of nominal plesiosynchronous clock periods. The substitute template has either one less (in the case of a positive stuff bit) or one more (in the case of a negative stuff bit) clock periods than the number of nominal plesiosynchronous clock periods. For example, in the T1 case, there are 772 nominal plesiosynchronous clock periods, so a "slow" template having 771 clock periods is substituted upon receipt of a positive stuff bit; and, a "fast" template having 773 clock periods is substituted upon receipt of a negative stuff bit. In the E1 case, there are 1024 nominal plesiosynchronous clock periods, so a "slow" template having 1023 clock periods is substituted upon receipt of a positive stuff bit; and, a "fast" template having 1025 clock periods is substituted upon receipt of a negative stuff bit.

Instead of releasing one full data bit at a time, the invention releases only a fraction of one bit during each one of a plurality of equally spaced intervals which are multiples of the tributary multi-frame (500 μs). More particularly, in the preferred T1 embodiment, 1/12th of one bit is added or removed during each one of the 12 phase adjustment intervals; in the preferred E1 embodiment, 1/9th of one bit is added or removed during each one of 9 phase adjustment intervals. The divisor values "12" and "9" are rounded down for simplicity: the approximate divisor required to generate a 1.544 MHz T1 clock signal from a 19.44 MHz system reference clock signal is 19.44/1.544=12.5907; and, for E1 it is 19.44/2.048=9.4922. The total number of template changes (so called phase commands) corresponding to 772 T1 data bits are represented on the right side of the FIG. 4A scale, as previously explained. For VC-11s, the average number of phase commands per justification is about 772*12/104=89.0769. The fractional part of the VC-11 average phase command (i.e. 0.076923) is exactly 1/13th, which is convenient in that an eight-times repeating pattern of twelve 89s followed by one 90 call be used to represent the total number of phase adjustment commands (i.e. 8*((12*89)+90)=9264), as seen on the right side of the FIG. 4A scale. For VC-12s, the average number of phase shifts per justification is about 1024*9/140=65.829. A twelve-times repeating pattern of nine 66s followed by two 65s, then eight 66s (i.e. 12*((9*66)+65+65)+8*66=9216) can be used to represent the total number of phase adjustment commands in the E1 case, as seen on the right side of the FIG. 4B scale.

The invention renders immaterial the occurrence of a positive or negative pointer justification event. PISO 18 need only issue negative phase adjustment commands when moving down the scale (decrementing), or positive phase adjustment commands when moving up the scale (incrementing) as previously explained. No round-off errors result, so the process is loss-less. Moreover, multiple same-direction pointer movements can be buffered if FIFO 14 has sufficient depth.

Persons skilled in the art will understand that positive or negative phase adjustment commands must be issued during intervals of fixed duration. By adjusting the interval frequency pointer processor 16 may increase or decrease (i.e. "compress" or "stretch") the time frame over which each pointer justification event is released, thereby continuously adapting to varying pointer justification event situations. The duration (period) of each pointer justification event release can be varied from a fraction of a second to any desired longer time interval, thereby facilitating jitter optimization for same-side pointer justification events displaced on average by a fraction of one second to many seconds or longer. If phase adjustment commands are issued during every available fixed duration interval, the value of pcT quickly approaches the value of tdb/tb*pjT*pc, which may be desirable if the magnitude of the difference between the two values is great enough, such as in a start up condition where rapid convergence of the two values is desired.

Several differential bands can be used to indicate which phase adjustment command issuance opportunities to use and which to skip in order to adapt the pointer justification event release rate as aforesaid. A number of phase adjustment commands tdb/tb*pc equivalent to one pointer justification event can be controllably released over any desired time interval tint made up of a plurality of sub-intervals each having a fixed duration fint by selecting only 1 of n fixed phase adjustment command issuance opportunities, where n=(tint/fint)/(tdb/tb*pc). If tdb/tb*pjT*pc≡pcT, a relatively slow the pointer justification event release rate is used; otherwise a faster rate can be selected and used. The fastest rate corresponds to issuance of one phase command every 500 μs, which is the tributary multi-frame minimum fixed opportunity interval. Multiples of this interval can be used to reduce the rate at which phase adjustment commands are issued.

For example, in the T1 case, one may use fixed opportunity intervals of fint=500 μs to release one pointer justification event over a one second interval and therefore issue phase adjustment commands every n=(1 s/500 us)/(772/104*12)=22.45 or about once every 22 fixed intervals. This rate could be applied to a first band corresponding to an interval within which pointer justification events occur at a rate between 0 and s≦2 events per interval. A second band corresponding to an interval within which pointer justification events occur at a rate between >2 and ≦5 events per interval may use tint=0.5 s, for example. A third band corresponding to an interval within which pointer justification events occur at a rate of >5 events per interval may use tint=0.2 s, etc. The first band constitutes a range of 0 through 178 phase adjustment commands applicable to the first 2 bytes (2 bytes*(772/104 bits/byte)*pc=178). The second band constitutes a range of 179 through 445 phase adjustment commands applicable to bytes 3–5 (5 bytes*(772/104 bits/byte)*pc=445), etc.

tint is selected to improve performance while minimizing complexity. For example, instead of selecting tint values of 1, 0.5 and 0.2 seconds for the first, second and third bands respectively, one could select tint values of 10, 5, 1, 0.8, 0.6, 0.4, 0.3, and 0.2 seconds for each of eight different bands but at some point the advantage gained is negligible in comparison to the required additional effort and expense.

Each band corresponds to a different selected "spread rate" for release of pointer justification events, which is directly proportional to the rate at which phase commands are issued. The slower the spread rate, the longer the period over which the effect of each event is spread. It is useful to employ different bands because faster spread rates induce higher jitter and therefore poorer performance. Ideally, if the system is balanced (no phase commands are being issued) a new pointer justification event is spread over the entire period available until the occurrence of the next event. If the events are spread over a period equal to or less than the period between events, the system always returns to an idle balanced state (no phase commands are being issued) between successive events. If the events occur at a faster rate, such that the available spreading period exceeds the period between successive events; and if the pointers are all "same side" (i.e. all positive or all negative pointers); then the tdb/tb*pjT*pc and pcT values diverge. If the magnitude of the difference between the two values is such that the threshold between the first two bands is crossed (i.e. after the difference exceeds 2 average bytes, or approximately 2*89 phase commands), then the spread period is decreased. The decreased spread period is maintained until the period between pointer justification events is greater than or equal to the spread period. If the periods are equal, the current band is maintained; if the spread period is less than the pointer justification event period, the system eventually converges to a lower band, thereby increasing the spread period. If the spread period then exceeds the pointer justification event period, the system moves back into the second band, and so on. If more bands are provided oscillation effects are reduced.

A T1/E1 clock generator in PISO 18 generates the aforementioned slow, nominal and fast clock templates. The nominal T1 rate is 1.544 Mbps. The nominal E1 rate is 2.048 Mbps. The 19.44 MHz REFCLK system reference clock signal rate is used to generate a T1 or E1 clock over a 2 KHz frame. The slow, nominal and fast clock templates slow: 771 (T1) or 1023 (E1) clock cycles in 500 µs (nominal rate −1); nominal: 772 (T1) or 1024 (E1) clock cycles in 500 µs (nominal rate); and, fast; 773 (T1) or 1025 (E1) clock cycles in 500 µs (nominal rate +1). All three templates are generated using the REFCLK signal. One of the three clock templates is selected by PISO 18 as previously explained, based upon the stuff bit control data extracted from the incoming data stream by demapper 12. A positive bit stuff selects the slow clock rate; a negative bit stuff selects the fast clock rate; and, a nominal bit stuff selects the nominal clock rate.

A mixture of T1 clock signals generated using high frequency (HF) T1 cycles made up of twelve 19.44 MHz cycles and low frequency (LF) T1 cycles made up of thirteen 19.44 MHz cycles can be combined to produce an overall rate of 1.544 MHz over the 500 µs period. The number of HF cycles and LF cycles when averaged equals 12.59, which is the approximate divisor required to generate a 1.544 MHz T1 clock signal from the 19.44 MHz system clock (19.44/1.544=12.5907). Similarly, a mixture of E1 clocks generated using nine 19.44 MHz cycles (HF E1 Cycles) and ten 19.44 MHz cycles (LF E1 Cycles) can produce an overall rate of 2.048 MHz over the 500 µs period. The number of HF E1 cycles and LF E1 cycles when averaged equals 9.49, which is the approximate divisor required to generate a 2.048 MHz E1 clock signal from the 19.44 MHz system clock (19.44/2.048=9.4922). The HF and LF cycles are distributed over the 500 µs period to generate each of the slow, nominal and fast templates for T1 and E1, as shown in Table 1:

TABLE 1

| Clock Rate | HF T1 Cycles | LF T1 Cycles | Overall T1 Cycles | HF E1 Cycles | LF E1 Cycles | Overall E1 Cycles |
| --- | --- | --- | --- | --- | --- | --- |
| Slow | 303 | 468 | 771 | 510 | 513 | 1023 |
| Nominal | 316 | 456 | 772 | 520 | 504 | 1024 |
| Fast | 329 | 444 | 773 | 530 | 495 | 1025 |

The phase offset is measured as the absolute value of the number of 19.44 MHz clock cycles offset required from the 2 kHz frame pulse (C1FP) to the first rising edge on the serial reference clock signal. Valid phase offset values are 0, 1, . . . ,11 for T1, and 0, 1, . . . ,8 for E1. In order to switch phase, both the serial clock and C1FP signals are passed through 12-bit shift registers, with the phase offset value being used to offset into the shift registers. The serial clock is output from the shift register position selected by the phase offset value.

Figure 5:
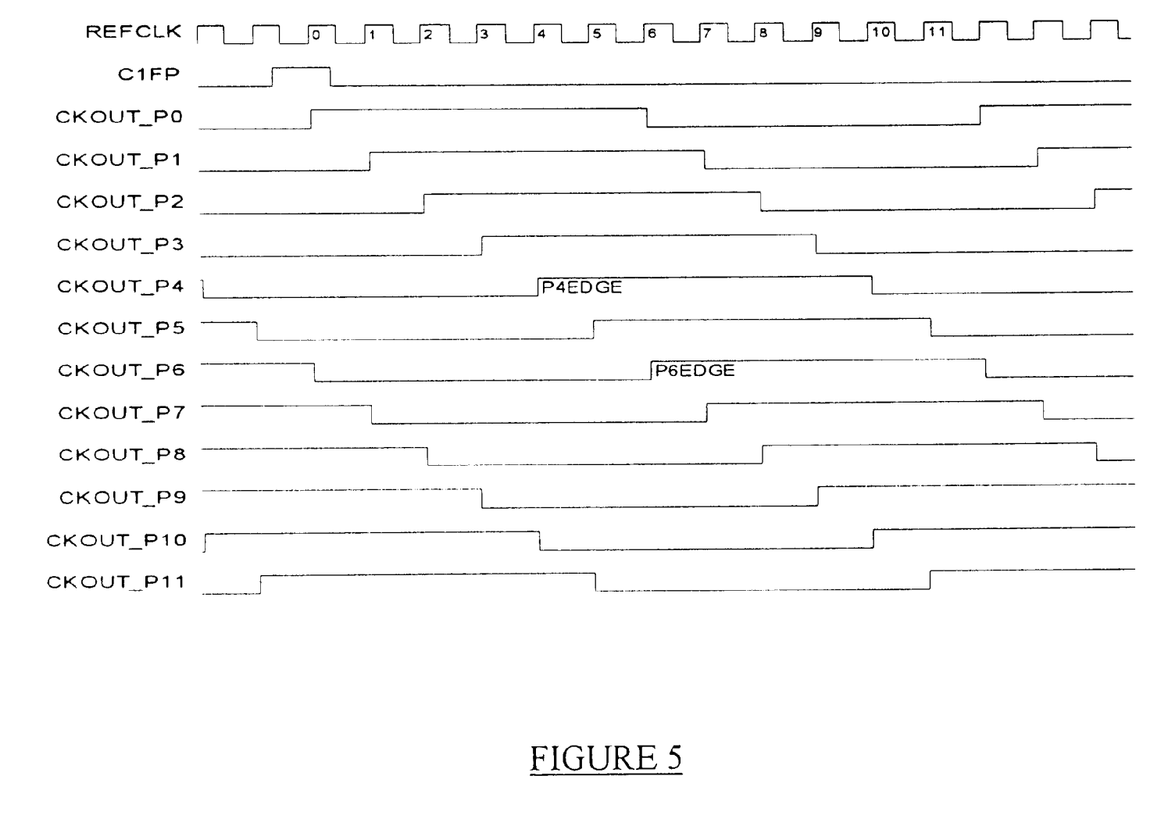
FIG. 5 is a timing diagram depicting representative waveforms of template clocks used in phase shifting operations in accordance with a preferred embodiment of the invention.

The FIG. 5 timing diagram depicts the T1 clock signals (i.e. CKOUT_P0 through CKOUT_P11) maintained in each one of the 12 shift registers. If a phase of zero is required, then the CKOUT_P0 clock signal is output. If, for example, the current phase value is "4", then CKOUT_P4 is output. The new phase value becomes available at the rising edge of the REFCLK signal after C1FP goes high. If the phase changes to (e.g.) "5", then CKOUT_P5 is output. The change-over occurs at P4EDGE, i.e. at the REFCLK rising edge after C1FP is sensed high in position 4 of the C1FP shift register. The next time the phase changes, the switch over occurs at P5EDGE, i.e. the REFCLK rising edge after C1FP is sensed high in position 5 of the C1FP shift register. If the phase does not change then the current clock signal is maintained.

As will be apparent to those skilled in the art in the light of the foregoing disclosure, many alterations and modifications are possible in the practice of this invention without departing from the spirit or scope thereof. The preferred embodiment described above is specific to demapping of T1/E1 tributaries from SONET/SDH signals, but any plesiosynchronous data type can be demapped from a synchronous network in accordance with the invention. For example, DS3/E3 and higher aggregations can be demapped in accordance with the invention if a higher frequency reference clock is employed, Pointer justification event spreading schemes having clock templates comprising different numbers of clock signals and/or corresponding to scales other than those depicted in FIGS. 4A, 4B can readily be developed in accordance with the invention. Accordingly, the scope of the invention is to be construed in accordance with the substance defined by the following claims.

What is claimed is:

1. A method of attenuating pointer justification event induced low frequency jitter during desynchronization of a synchronous data stream into a plesiosynchronous data stream characterized by a clock rate T and by a tb byte multi-frame containing an nominal number rdb of data bits, said method comprising:

(a) providing an integer number pc of phase adjustment commands;

(b) maintaining, within a range from 1 to tb, a count pjT of a total number of positive ones of said pointer justification events previously encountered in said data stream;

(c) maintaining, within a range from 1 to tdb*pc, a count pcT of a total number of previously issued ones of said phase adjustment commands;

(d) upon detection of a positive one of said pointer justification events in said data stream, incrementing pjT by 1;

(e) upon detection of a negative one of said pointer justification events in said data stream, decrementing pjT by 1;

(f) upon detection of a null one of said pointer justification events in said data stream, maintaining pjT without change;

(g) if tdb/tb*pjT*pc>pcT, issuing positive ones of said phase adjustment commands while incrementing pcT by 1 for each one of said issued positive phase adjustment commands until tdb/tb*pjT*pc=pcT;

(h) if tdb/tb*pjT*pc<pcT, issuing negative ones of said phase adjustment commands while decrementing pcT by 1 for each one of said issued negative phase adjustment commands until tdb/tb*pjT*pc=pcT; and, (i) varying said clock rate T by adding said issued positive phase adjustment commands to said clock rate T and subtracting said issued negative phase adjustment commands from said clock rate T as said positive and said negative phase adjustment commands respectively are issued.

2. A method as defined in claim 1, further comprising:

(a) providing an integer number of output clock signal templates equal to said integer number of phase adjustment commands, each one of said templates corresponding to a unique one of said phase adjustment commands;

(b) initially applying an $i^{th}$ one of said templates as said clock rate T;

wherein:

(i) said adding said issued positive phase adjustment commands to said clock rate T further comprises applying an $i+1^{th}$ one of said templates as said clock rate T; and, (ii) said subtracting said issued negative phase adjustment commands from said clock rate T further comprises applying an $i-1^{th}$ one of said templates as said clock rate T.

3. A method as defined in claim 2, further comprising selecting each one of said templates as one of:

(a) a slow template comprising tdb−1 clock periods;

(b) a nominal template comprising tdb−1 clock periods; and, (c) a fast template comprising tdb−1 clock periods.

4. A method as defined in claim 3, wherein said selecting each one of said templates further comprises:

(a) selecting said slow template upon detection of a positive bit stuff control indicator in said data stream;

(b) selecting said fast template upon detection of a negative bit stuff control indicator in said data stream; and, (c) selecting said nominal template upon detection of an absence of bit stuff control indicators in said data stream.

5. A method as defined in claim 1, further comprising issuing said phase adjustment commands during one of n phase adjustment command issuance opportunities, where n=(tint/fint)/(tdb/tb*pc) and tint is a selectable duration time interval comprising a plurality fint of fixed duration sub-intervals.

* * * * *